June 4, 1929.  H. KOBAYASHI  1,715,764

DIFFERENTIAL VALVE FOR THE AIR BRAKES OF CARS

Filed July 15, 1927

Inventor:
Hideo Kobayashi
By
Liggus & Adams
Attorneys

Patented June 4, 1929.

1,715,764

UNITED STATES PATENT OFFICE

HIDEO KOBAYASHI, OF TOKYO, JAPAN.

DIFFERENTIAL VALVE FOR THE AIR BRAKES OF CARS.

Application filed July 15, 1927, Serial No. 206,055, and in Japan September 7, 1926.

My invention relates to differential valves for air brakes of cars and aims, among other objects, to provide an improved device of this kind which is simple in construction and easy to operate, and which produces the same results as the triple valve and the distributing valve in the air brake systems heretofore used.

The invention is more particularly illustrated with reference to the accompanying drawing in which:—

Figure 1:
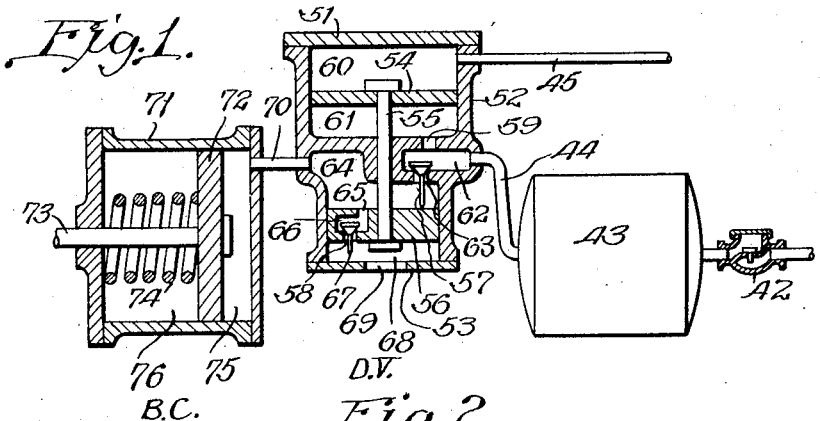
Fig. 1 is a longitudinal sectional view of the improved differential valve for brakes showing the valve actuator in balanced position.

Referring to Fig. 1 of the drawing, (45) is a variable pressure branch pipe or so-called brake pipe, which is connected at one end to the operator valve, whereby the operator may increase or decrease the pressure in the pipe in the desired manner. An automatic air reservoir (43), having a suitable size in proportion to the brake cylinder, is connected to the high pressure air reservoir or to the delivery pipe of the air compressor through a high pressure branch pipe provided with a check valve (42) so that a predetermined pressure may be maintained in said air reservoir. The differential valve (52) is shown as being cylindrical in form and is provided with a cover (51) for a variable pressure chamber (60), and a cover (53) for an exhaust chamber (68). The variable pressure chamber (60) is connected to aforesaid variable pressure pipe (45) so that the pressure in said chamber varies according to the change of pressure of the variable pressure pipe. The constant-pressure chamber (61) forms a cylinder together with said variable-pressure chamber (60) and is in communication with the automatic air chamber (62) through an opening (59). The automatic air chamber (62) is in communication with the automatic air reservoir (43) so that the pressure in the constant pressure chamber (61) is the same as in the automatic air reservoir (43).

The brake air chamber (64) which forms a cylinder together with the exhaust chamber (68), is in communication with the pressure chamber (75) of the brake cylinder (71) by the brake air pipe (70) so that the pressure in the brake air chamber is always the same as the pressure in the brake cylinder or so-called brake pressure. The brake air chamber (64) is also in communication with aforesaid automatic air chamber (62) by means of an opening (63) controlled by the brake air valve (57) through which the brake air is supplied from the air reservoir (43).

The valve actuator, constituting one of the essential parts of the present invention, comprises two pistons (54) and (56) rigidly connected by the piston rod (55). The driving piston (54) partitions aforesaid variable-pressure chamber (60) from the constant pressure chamber (61) and is subjected at one side to the pressure of the variable-pressure chamber or of the variable pressure pipe, and on the other side to the pressure of the constant pressure chamber or of the automatic air reservoir, and slides within said chambers. The balancing piston (56) partitions the brake air chamber (64) from the exhaust chamber (68) and slides in said two chambers so that one side of said piston is subjected to the brake air pressure and the other side to atmospheric pressure. The balancing piston, at the side of the brake air chamber (64) is caused to actuate the brake air valve (57) which opens the automatic air chamber (62) to the brake air chamber (64) and is also provided with exhaust openings or ports (58) and (65), between which an exhaust valve chamber (66) is formed. Within said exhaust chamber, an exhaust valve (67) is arranged to normally close the exhaust port (58) and has a stem projecting out of the piston. The exhaust valve (67) is closed during the movement of the valve actuator but at the end of the downward stroke the stem of the exhaust valve (67) strikes the cover (53) or some other fixed part, whereby the valve is opened and the brake air chamber (64) is in communication with the exhaust chamber (68) to open the brake cylinder (75) to the atmosphere.

Since the pistons are rigidly connected together, as above stated it is quite evident that the valve actuator is subjected to pressures downwardly on its axis by the variable pressure pipe pressure and the brake cylinder pressure and also upwardly by the automatic air reservoir pressure.

When the valve actuator is balanced in the position shown in Fig. 1, the forces acting on the valve rod in the downward and upward directions are equal. In other words, the sum of the brake pipe pressure multiplied by the effective area of the driving piston and the brake pressure multiplied by the effective area of the balancing piston, (hereafter to be called the "downward force"), is equal to the pressure of the constant air chamber pressure multiplied by the effective area of the driving piston (hereafter to be called the "upward force"). (The dead weight of the valve actuator itself as well as friction are ignored for sake of the clearness of explanation as the direction of the valve is not limited vertically.)

The variable pressure pipe pressure or the pressure in the variable pressure chamber (60), may be varied at the will of the operator, as above stated, while the pressure in the chamber (61) remains constant as stated in the preceding paragraph, so that said downward force may be made larger or smaller in comparison to said upward force to any desired degree.

When the downward force is made to exceed the upward force, the valve actuator moves downward and when the downward force is less than the upward force, the valve actuator moves upward.

It should be noted that by properly determining the ratio of the effective areas of the driving piston (54) in the variable pressure chamber and the balancing piston (56) in the brake air chamber (64), the changes of the brake pipe pressure and the brake pressure may be made to hold a simple ratio or multiple relation, whereby the brake action may be rendered sharp and the operation easy. For instance, when the variable pressure pipe pressure is changed by 1 kilogram per square centimetre, the brake cylinder pressure is changed by 5 kilogram per square centimetre. This feature will be further stated hereinafter.

The operation of the improved differential valve is as follows:—

Figure 2:
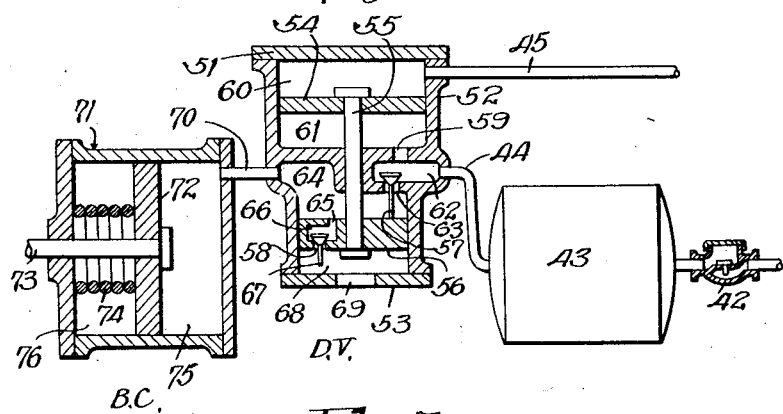
Fig. 2 is a similar view showing the position of the valve actuator when the brakes are being applied.

To apply the brakes, the operator merely reduces the pressure in the brake variable pressure pipe (45), when the pressure in the variable pressure chamber (60) reduces accordingly and the valve driver moves upward by the upward force exceeding the downward force in this case. The upper side of the balancing piston finally strikes the stem of the brake air valve (57) which extends downwardly into the chamber 64, whereby the valve is opened as shown in Fig. 2. The air pressure accumulated in the automatic air reservoir (43) rushes into the brake air chamber (75) through the automatic air chamber (62), brake air chamber (64) and the brake air pipe (70). The brake piston (72) and piston rod (73) are pushed and brake force is given on the car wheels through the intermediary of levers and other suitable mechanism.

To release the brakes, the pressure in the pipe (45) is increased so that the downward force exceeds the upward force and the valve actuator moves downward. At the end of said downward movement of the valve actuator, the lower end of the stem of the exhaust valve (67) strikes the cover (53) of the exhaust chamber and the exhaust valve (67) is opened. The brake air chamber (64) is then in communication with the exhaust chamber (68) and the air chamber (75) of the brake cylinder is opened to the atmosphere, whereby the brake pressure is released. The brake piston (72) and piston rod (73) are returned to their normal position by the spring (74) and the brake force on the car wheels is released.

For effecting a partial brake action, the pressure of the brake pipe (45) is only slightly reduced as stated in the paragraph of brake action. The valve actuator moves upward and the balancing piston (56) strikes the stem of the brake air valve (57) to open the same, whereby brake air is supplied to the brake cylinder (71) to cause the brake action as stated before. Owing to the increase of the brake cylinder pressure, the pressure in the brake air chamber (64) is increased accordingly and the downward pressure acting on the balancing piston (56) being increased, the downward force is augmented, which opposes the upward force caused by the reduction of the pressure in the variable pressure chamber and the brake air valve (57) is closed, so that the valve actuator is again brought into the balanced state, the pressure in the valve being balanced, thereby causing the partial brake action.

For partial release of the brakes, the pressure in the variable pressure pipe is slightly increased causing the valve actuator to move downwardly to open the exhaust valve, thereby releasing the braking action. The pressure of the brake air chamber acting on the balancing piston decreases, which causes a reduction of the downward force on the valve actuator, and when said reduction just balances the increase of the downward force caused by the increase of the pressure of the variable pressure chamber, the releasing action is stopped and the partial release of the brakes is obtained.

For emergency brake action, the brake pipe pressure is reduced suddenly to its extremity and aforesaid brake action is caused suddenly.

In the triple valve device used in the air brake systems, the partial brake action is obtained by shutting off the brake air immediately after it is supplied the brake cylinder by means of a slide valve which interrupts the communication of the air between the brake cylinder and the air distributing mechanism. The brake pressure therefore is not caused proportionately to the reduction of the brake pipe pressure and is quite defective as to the accuracy of the brake action.

For example when the variable pressure pipe pressure is reduced by 2 kilograms per square centimetre to give a partial brake action for a railway train having, say, ten brake cylinders, it is very uncertain whether the desired brake cylinder pressure just corresponding to the reduction of pressure by 2 kilograms per square centimetre for each brake cylinder, has been obtained or not. As a matter of fact, the adjustment and the resistance of air passages of each triple valve not being entirely equal, it can never be obtained, and more especially where the strokes of the brake cylinders are not equal on account of the wear of brake blocks or the difference of the clearance of the brake riggings, etc. When the pressure in each brake cylinder is not equal, the brake force on the wheels is accordingly unequal and may exceed the limit of brake force to the extent of causing so-called "skidding" of some wheels, while far below the brake limit for other wheels. A perfect brake operation can not be obtained with such a device, but would probably be the cause of a serious train accident.

According to the present invention such troubles may be entirely avoided. Because of the fact that the brake air chamber (64) of the differential valve is always in communication with the brake cylinder (this feature is to be especially noted), the brake air is always supplied until the valve actuator is automatically balanced, regardless of any difference in the strokes of the brake pistons (72) or of any unequal resistance of air passages, and the brake pressure for each brake cylinder is absolutely equal.

Furthermore, in the triple valve device heretofore in use, the brake cylinder pressure caused by a certain decrease of the variable pressure pipe pressure, is unknown to the operator. According to the present invention, the brake pressure for each brake cylinder can be known in the operator's compartment by reading the decrease of pressure in the variable pressure pipe at the pressure gauge.

Figure 3:
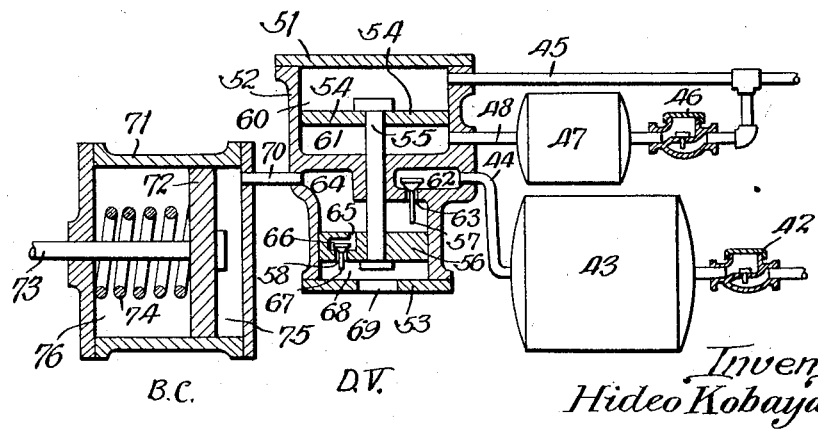
Fig. 3 is a longitudinal sectional view of a modified form of the differential valve.

In the modified form of the present invention shown in Fig. 3, the constant pressure chamber (61) is shut off from the automatic air chamber (62) by a partition wall and is connected to a constant pressure reservoir (47) not in communication with the brake cylinder conduits. The constant pressure air reservoir (47) is preferably supplied with air pressure from the variable pressure pipe (45) through a check valve (46). The operation of this form is quite similar to that shown in Figs. 1 and 2.

According to this modified form, the pressure in the constant pressure chamber (61) is separate from that in the brake cylinder conduits, and the decrease of pressure at the pressure gauge in the operator's compartment precisely shows the difference of pressure between the constant pressure chamber and the variable pressure chamber, whereby the brake cylinder pressure may be more precisely known.

As will be seen, the arrangement of the chambers is such, that the variable pressure chamber is adjacent to the constant pressure chamber and the brake pressure chamber adjacent to the exhaust chamber so that no pressure differences take place at both sides of each piston, whereby the loss of pressure owing to the leakage normally, or at the time of the release, may be entirely avoided.

What I claim is:—

1. In combination with a variable pressure pipe and a brake cylinder; a differential valve, comprising a casing having two cylinders; a valve actuator comprising a piston slidably mounted in each cylinder, said pistons being rigidly connected together and of different areas, the larger piston defining, on one side, a variable pressure chamber in communication with the variable pressure pipe and on the other side a constant pressure chamber, the smaller piston defining, on one side, a brake air chamber in communication with the brake cylinder and on the other side an exhaust chamber; said constant pressure chamber being adjacent to the brake air chamber; a constant pressure reservoir; an automatic air chamber in communication with said reservoir and disposed between the constant pressure and brake air chambers and having ports communicating with said chambers and with said constant pressure reservoir; a normally closed brake air valve in the brake air chamber port; the other ports being open; a valve controlled port in the smaller piston adapted to open when the piston is moved in one direction; the brake air valve being opened by the movement of said piston in the opposite direction; said piston being actuated by the increase or decrease of pressure in the variable pressure pipe.

2. In an air brake system, the combination with a variable pressure pipe; a brake cylinder; and a constant pressure reservoir; of a valve casing having upper and lower cylinders; a valve actuator comprising a piston slidably mounted in each cylinder; said pistons being rigidly connected together and of different areas; the larger piston being in the upper cylinder and defining an upper variable pressure chamber in communication with the variable pressure pipe and a lower constant pressure chamber in communication with the constant pressure reservoir; the smaller piston being in the lower cylinder and defining an upper brake air chamber in communication with the brake cylinder and a lower exhaust chamber in communication with the atmosphere; an air passageway communicating with the constant pressure reservoir and the brake air chamber; a normally closed brake air valve in said passageway having a stem projecting downwardly into the brake air chamber; an exhaust passageway through the smaller cylinder; an exhaust valve to normally close said passageway and having a stem projecting downwardly into the exhaust chamber; said actuator being movable by the change of pressure in the variable pressure pipe to cause the smaller piston, when moved in one direction, to strike the stem of the brake air valve to apply the brakes or to cause the stem of the exhaust valve to strike the lower end of the exhaust chamber and release the brakes when moved in the other direction.

HIDEO KOBAYASHI.